US012719059B2

(12) United States Patent
Bhattacharya et al.

(10) Patent No.: US 12,719,059 B2
(45) Date of Patent: Aug. 25, 2026

(54) ELECTRODE ASSEMBLIES HAVING ALLOYED INTERFACES AND METHODS OF FORMING THE SAME

(71) Applicant: GM GLOBAL TECHNOLOGY OPERATIONS LLC, Detroit, MI (US)

(72) Inventors: Diptak Bhattacharya, Royal Oak, MI (US); Caleb Reese, Ferndale, MI (US); Thomas E. Moylan, Troy, MI (US); Andrew Clay Bobel, Troy, MI (US); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 958 days.

(21) Appl. No.: 17/971,326

(22) Filed: Oct. 21, 2022

(65) Prior Publication Data

US 2024/0136534 A1 Apr. 25, 2024
US 2024/0234739 A9 Jul. 11, 2024

(51) Int. Cl.
*H01M 4/66* (2006.01)
*H01M 4/02* (2006.01)
(Continued)

(52) U.S. Cl.
CPC ......... *H01M 4/662* (2013.01); *H01M 4/0471* (2013.01); *H01M 4/621* (2013.01);
(Continued)

(58) Field of Classification Search
CPC .... H01M 4/662; H01M 4/0471; H01M 4/669; H01M 10/0525; H01M 4/134; H01M 4/1395; H01M 10/052; Y02E 60/10
See application file for complete search history.

(56) References Cited

U.S. PATENT DOCUMENTS

| | | | |
|---|---|---|---|
| 8,496,855 | B2 | 7/2013 | Choi |
| 8,974,946 | B2 | 3/2015 | Cai et al. |

(Continued)

FOREIGN PATENT DOCUMENTS

| | | | |
|---|---|---|---|
| CN | 108470902 | A | 8/2018 |
| CN | 108493485 | A | 9/2018 |

(Continued)

OTHER PUBLICATIONS

Lin et al. "Template-sacrificed hot fusion construction and nanoseed modification of 3D porous copper nanoscaffold host for stable-cycling lithium metal anodes." Advanced Functional Materials 31.30 (2021): 2102735. (Year: 2021).

(Continued)

*Primary Examiner* — Basia A Ridley
*Assistant Examiner* — Heng M. Chan
(74) *Attorney, Agent, or Firm* — Harness, Dickey & Pierce, P.L.C.

(57) ABSTRACT

An electrode assembly includes a current collector, a lithium metal foil, and an alloyed interface that chemically binds the current collector and the lithium metal foil. In certain variations, the alloyed interface includes an intermediate layer disposed between the current collector and the lithium metal foil, a portion of the current collector adjacent to the intermediate layer is alloyed with the indium, gallium, or alloy of indium and gallium defining the intermediate layer, and a portion of the lithium metal foil adjacent to the intermediate layer is alloyed with the indium, gallium, or alloy of indium and gallium defining the intermediate layer. In other variations, the alloyed interface includes a copper-lithium alloy.

9 Claims, 8 Drawing Sheets

(51) Int. Cl.
*H01M 4/04* (2006.01)
*H01M 4/62* (2006.01)
*H01M 10/0525* (2010.01)

(52) U.S. Cl.
CPC ....... *H01M 4/669* (2013.01); *H01M 10/0525* (2013.01); *H01M 2004/021* (2013.01)

(56) References Cited

U.S. PATENT DOCUMENTS

| | | | | |
|---|---|---|---|---|
| 9,123,939 | B2 | 9/2015 | Xiao et al. | |
| 9,160,036 | B2 | 10/2015 | Yang et al. | |
| 9,252,411 | B2 | 2/2016 | Elhamid et al. | |
| 9,302,914 | B2 | 4/2016 | Liu et al. | |
| 9,318,738 | B2 | 4/2016 | Kim et al. | |
| 9,362,552 | B2 | 6/2016 | Sohn et al. | |
| 9,373,829 | B2 | 6/2016 | Xiao et al. | |
| 9,437,871 | B2 | 9/2016 | Zhou et al. | |
| 9,537,144 | B2 | 1/2017 | Huang et al. | |
| 9,647,254 | B2 | 5/2017 | Dadheech et al. | |
| 9,742,028 | B2 | 8/2017 | Zhou et al. | |
| 9,896,763 | B2 | 2/2018 | Dadheech et al. | |
| 9,905,847 | B2 | 2/2018 | Dadheech et al. | |
| 9,923,189 | B2 | 3/2018 | Xiao | |
| 9,929,435 | B2 | 3/2018 | Cai et al. | |
| 9,979,008 | B2 | 5/2018 | Dai et al. | |
| 9,985,284 | B2 | 5/2018 | Dadheech et al. | |
| 10,084,204 | B2 | 9/2018 | Dai et al. | |
| 10,128,481 | B2 | 11/2018 | Xiao et al. | |
| 10,141,559 | B2 | 11/2018 | Xiao et al. | |
| 10,199,643 | B2 | 2/2019 | Zhou et al. | |
| 10,312,501 | B2 | 6/2019 | Yang et al. | |
| 10,326,166 | B2 | 6/2019 | Yang et al. | |
| 10,367,201 | B2 | 7/2019 | Yang et al. | |
| 10,381,170 | B2 | 8/2019 | Dai et al. | |
| 10,396,360 | B2 | 8/2019 | Xiao et al. | |
| 11,094,996 | B2 | 8/2021 | Xiao et al. | |
| 11,239,459 | B2 | 2/2022 | Yersak et al. | |
| 11,404,698 | B2 | 8/2022 | Xu et al. | |
| 2007/0190415 | A1 | 8/2007 | Sung et al. | |
| 2012/0244418 | A1 | 9/2012 | Cheng et al. | |
| 2013/0115513 | A1 | 5/2013 | Choi et al. | |
| 2015/0017535 | A1 | 1/2015 | Hong et al. | |
| 2015/0056387 | A1 | 2/2015 | Dadheech et al. | |
| 2015/0056493 | A1 | 2/2015 | Dadheech et al. | |
| 2015/0056507 | A1 | 2/2015 | Dadheech et al. | |
| 2015/0228975 | A1 | 8/2015 | Lee et al. | |
| 2015/0349307 | A1 | 12/2015 | Dadheech et al. | |
| 2016/0172706 | A1 | 6/2016 | Xiao et al. | |
| 2016/0172710 | A1 | 6/2016 | Liu et al. | |
| 2017/0162859 | A1 | 6/2017 | Yang et al. | |
| 2017/0214079 | A1 | 7/2017 | Dai et al. | |
| 2017/0271678 | A1 | 9/2017 | Yang et al. | |
| 2017/0338522 | A1 | 11/2017 | Hu et al. | |
| 2018/0294517 | A1 | 10/2018 | Yersak et al. | |
| 2018/0309165 | A1 | 10/2018 | Yersak et al. | |
| 2018/0309166 | A1 | 10/2018 | Yersak et al. | |
| 2018/0375148 | A1 | 12/2018 | Yersak et al. | |
| 2019/0319259 | A1* | 10/2019 | Balogh | H01M 4/0471 |
| 2019/0372155 | A1 | 12/2019 | Yersak et al. | |
| 2020/0052338 | A1 | 2/2020 | Liu et al. | |
| 2020/0274155 | A1 | 8/2020 | Li | |
| 2020/0395630 | A1 | 12/2020 | Yersak et al. | |
| 2021/0194046 | A1 | 6/2021 | Nam et al. | |
| 2022/0077469 | A1 | 3/2022 | Hwang et al. | |
| 2023/0361311 | A1 | 11/2023 | Nagy et al. | |
| 2024/0047693 | A1 | 2/2024 | Cain et al. | |
| 2025/0087660 | A1 | 3/2025 | Nagy et al. | |

FOREIGN PATENT DOCUMENTS

| | | | |
|---|---|---|---|
| CN | 112751077 | A | 5/2021 |
| CN | 113488656 | A | 10/2021 |
| CN | 117059815 | A | 11/2023 |
| CN | 117917784 | A | 4/2024 |
| CN | 119581498 | A | 3/2025 |
| DE | 102018133725 | A1 | 7/2019 |
| DE | 102019209397 | A1 | 12/2020 |
| DE | 102020125838 | A1 | 5/2021 |
| DE | 102020127847 | A1 | 5/2021 |
| DE | 102022106294 | A1 | 11/2022 |
| DE | 102022128143 | A1 | 11/2023 |
| DE | 102023111497 | A1 | 5/2024 |
| DE | 102023130561 | A1 | 3/2025 |
| WO | WO-2014182281 | A1 | 11/2014 |
| WO | WO-2017045573 | A1 | 3/2017 |

OTHER PUBLICATIONS

Zhang et al. "Lithiophilic 3D porous CuZn current collector for stable lithium metal batteries." ACS Energy Letters 5.1 (2019): 180-186. (Year: 2019).

Office Action dated Jun. 21, 2024 from German Patent Office for German Patent No. 102023130561.1; 4pgs.

Non-Final Office Action issued Jun. 5, 2025, for U.S. Appl. No. 17/737,744; 19 pages.

Liu et al.; "Inducing uniform lithium nucleation by integrated lithium-rich li-in anode with lithiophilic 3D framework"; Energy Storage Materials; V.33; Aug. 2020; pp. 423-431.

Rupp et al.; "Lithium Diffusion in Copper"; The Journal of Physical Chemistry Letters; 2019, 10, 17; pp. 5206-5210.

Han, Xiaogang et al., "Negating interfacial impedance in garnet-based solid-state Li metal batteries," *Nature Materials* 16, pp. 572-579 (Published online Dec. 19, 2016); DOI: 10.1038/nmat4821.

Sharafi, Asma et al., "Surface Chemistry Mechanism of Ultra-Low Interfacial Resistance in the Solid-State Electrolyte $Li_7La_3Zr_2O_{12}$," *Chem. Mater.* (29) 18, pp. 7961-7968; DOI: 10.1021/acs.chemmater.7b03002 (Published Sep. 1, 2017).

Xu, Qin et al., "Effect of oxidation on the Mechanical Properties of Liquid Gallium and Eutectic Gallium-Indium," *Physics of Fluids* 24, 063101 (2012); DOI: 10.1063/1.4724313 (Published online Jun. 8, 2012).

Liu et al., Lithium Metal Anodes with an Adaptive "Solid-Liquid" Interfacial Protective Layer, Journal of the American Chemical Society, pp. A-F (Year: 2017).

Luo, Zheng et al.; "Dendrite-free lithium metal anode with lithiophilic interphase from hierarchical frameworks by tuned nucleation"; Energy Storage Materials 27 (Jan. 2020) pp. 124-132.

Zhang, Huimin et al.; "Lithiophilic-lithiophobic gradient interfacial layer for a highly stable lithium metal anode"; Nature Communications; (2018) 9:3729 | DOI:10.1038/s41467-018-06126-z | www.nature.com/naturecommunications; 11 pages.

Sayed Youssef Sayed Nagy et al.; U.S. Appl. No. 17/737,744, filed May 5, 2022, entitled "Current Collectors for Electrochemical Cells That Cycle Lithium Ions"; 42 pages.

Jeffrey David Cain et al.; U.S. Appl. No. 17/879,419, filed Aug. 2, 2022, entitled "Electrode Assemblies Prepared Using Diffusion Coupling"; 43 pages.

Final Office Action issued Dec. 11, 2025, for U.S. Appl. No. 17/737,744; 24 pages.

* cited by examiner

ELECTRODE ASSEMBLIES HAVING ALLOYED INTERFACES AND METHODS OF FORMING THE SAME

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

Many different materials may be used to create components for a lithium-ion battery. For example, the negative electrode may be defined by a lithium-containing material, such as metallic lithium, so that the electrochemical cell is considered a lithium metal battery or cell. Metallic lithium for use in the negative electrode of a rechargeable battery has various potential advantages, including having the highest theoretical capacity and lowest electrochemical potential. Thus, lithium metal batteries are one of the most promising candidates for high energy storage systems. However, lithium metal does not readily adhere to common current collector materials, such as copper, using different physical or mechanical techniques, and delamination often occurs as a result of stresses and strains that can arise during cell fabrication and/or cell operation. The delamination of lithium metal foils from current collectors often causes diminished performance and/or potential premature electrochemical cell failure. Further, copper-containing current collectors are lithiophobic often resulting in non-uniform plating and dendrite formation during cycling. Accordingly, it would be desirable to develop materials for use in high energy lithium-ion batteries that improve adhesion, and as such, cell performance.

SUMMARY

This section provides a general summary of the disclosure, and is not a comprehensive disclosure of its full scope or all of its features.

The present disclosure relates to electrode assemblies having alloyed interfaces binding current collectors and electroactive material layers, and also to methods of making and using the same.

In various aspects, the present disclosure provides an electrode assembly of an electrochemical cell that cycles lithium ions. The electrode assembly includes a current collector, a lithium metal foil, and an alloyed interface that chemically binds the current collector and the lithium metal foil.

In one aspect, the current collector may include copper, stainless steel, or a combination thereof.

In one aspect, the alloyed interface may include indium, gallium, or an alloy of indium and gallium.

In one aspect, the alloyed interface may include an intermediate layer disposed between the current collector and the lithium metal foil, a portion of the current collector adjacent to the intermediate layer and alloyed with the indium, gallium, or alloy of indium and gallium, and a portion of the lithium metal foil adjacent to the intermediate layer and alloyed with the indium, gallium, or alloy of indium and gallium.

In one aspect, the portion of the current collector adjacent to the intermediate layer and alloyed with the indium, gallium, or alloy of indium and gallium may be at least 0.5% of the average thickness of the current collector; and the portion of the lithium metal foil adjacent to the intermediate layer and alloyed with the indium, gallium, or alloy of indium and gallium may be at least 0.5% of the average thickness of the lithium metal foil.

In one aspect, the intermediate layer may have an average thickness greater than or equal to about 0.001 micrometers to less than or equal to about 1 micrometer, and the alloyed interface may have an average thickness greater than or equal to about 0.005 micrometers to less than or equal to about 5 micrometers.

In one aspect, the current collector may have an average thickness greater than or equal to about 8 micrometers to less than or equal to about 60 micrometers, and the lithium metal foil may have an average thickness greater than or equal to about 10 micrometers to less than or equal to about 100 micrometers.

In one aspect, the alloyed interface may include a copper-lithium alloy.

In one aspect, the current collector may have an average thickness greater than or equal to about 8 micrometers to less than or equal to about 60 micrometers, the lithium metal foil may have an average thickness greater than or equal to about 10 micrometers to less than or equal to about 100 micrometers, and the alloyed interface may have an average thickness greater than or equal to about 0.005 micrometers to less than or equal to about 5 micrometers.

In various aspects, the present disclosure provides a method of preparing an electrode assembly for an electrochemical cell that cycles lithium ions. The method may include heating a precursor electrode assembly using a one-sided heating method. The precursor electrode may include a current collector, a lithium metal foil, and an intermediate layer disposed between the current collector and the lithium metal foil. The heating may include raising a temperature of the current collector to a temperature above a melting temperature of the intermediate layer such that a first surface of the intermediate layer adjacent to the current collector forms an alloy with the a portion of the current collector opposing the intermediate layer and a second surface of the intermediate layer adjacent to the lithium metal foil forms an alloy with a portion of the lithium metal foil opposing the intermediate layer to form the electrode assembly. The intermediate layer together with the portion of the current collector and the portion of the lithium metal foil defining an alloyed interface that chemically binds the current collector and the lithium metal foil. The alloyed interface together with the current collector and the lithium metal foil defines the electrode assembly.

In one aspect, the intermediate layer may include indium, gallium, or an alloy of indium and gallium, and the current collector may include copper, stainless steel, or a combination thereof.

In one aspect, the temperature may be greater than or equal to about 29° C. to less than or equal to about 181° C.

In one aspect, the temperature may be a first temperature, and the method may further include cooling the electrode assembly to a second temperature that is greater than or equal to about 20° C. to less than or equal to about 25° C.

In one aspect, the current collector may be held at the first temperature for a period greater than or equal to about 0.5 second to less than or equal to about 5 seconds.

In various aspects, the present disclosure provides a method of preparing an electrode assembly for an electrochemical cell that cycles lithium ions. The method may include heating a precursor electrode assembly using a one-sided heating method. The precursor electrode assembly may include a current collector and a lithium metal foil disposed on one or more surfaces of the current collector. The heating may include raising a temperature of the current collector to a temperature above the melting temperature of the lithium metal foil so as to cause metal from the current collector to diffusion into the lithium metal foil to form an alloyed interface that chemically binds the current collector and the lithium metal foil. The alloyed interface together with the current collector and the lithium metal foil may define the electrode assembly.

In one aspect, the intermediate layer may include indium, gallium, or an alloy of indium and gallium, and the current collector may include copper, stainless steel, or a combination thereof.

In one aspect, the temperature may be greater than or equal to about 181° C. to less than or equal to about 300° C.

In one aspect, the temperature is a first temperature, and the method further includes cooling the electrode assembly to a second temperature that is greater than or equal to about 20° C. to less than or equal to about 25° C.

In one aspect, the electrode assembly may be cooled to the second temperature at a cooling rate greater than or equal to about 100° C./second to less than or equal to about 500° C./second.

In one aspect, the current collector may be held at the first temperature for a period greater than or equal to about 0.5 second to less than or equal to about 5 seconds.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
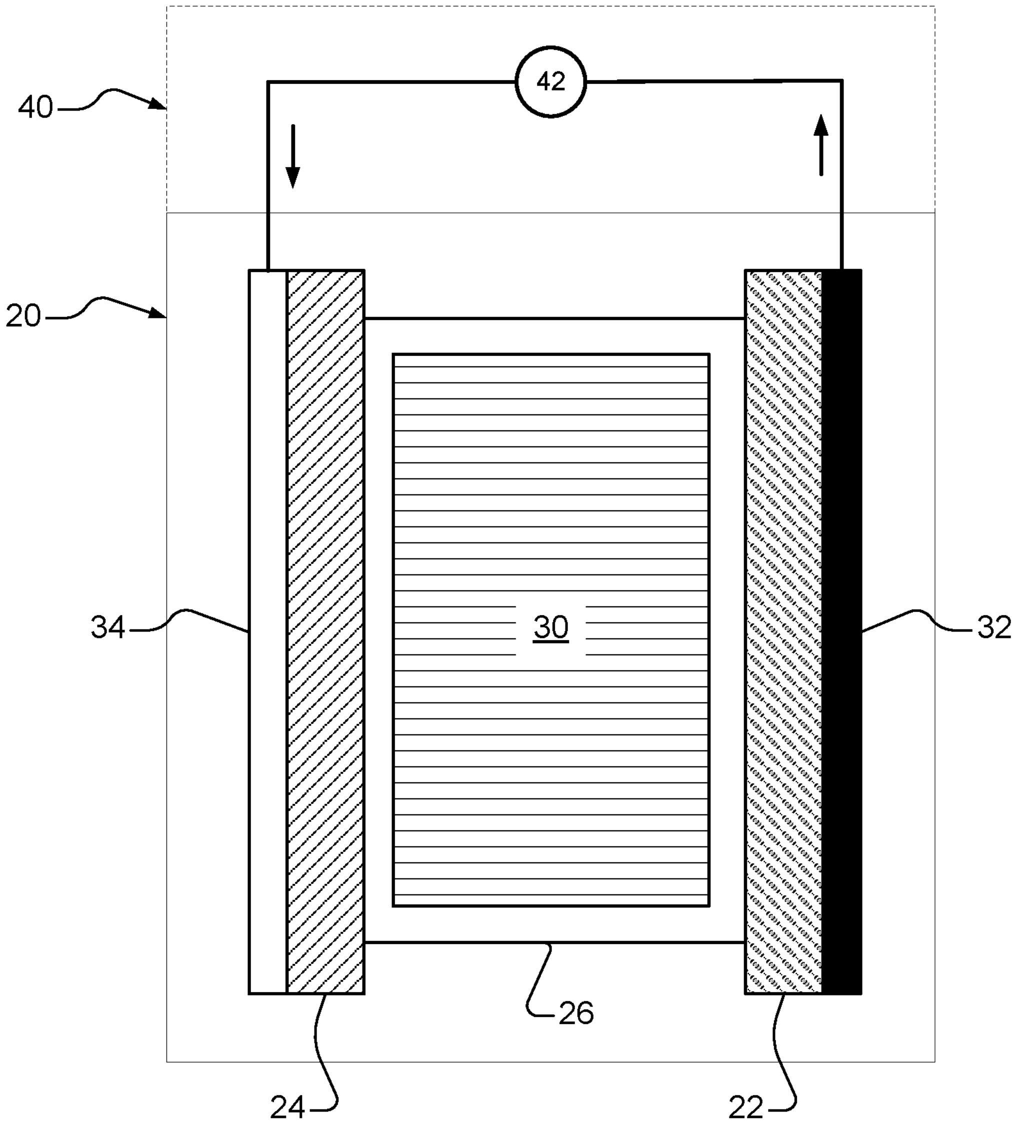
FIG. 1 is an illustration of an example electrochemical cell including an electrode assembly having an alloyed interface binding a current collector and an electroactive material layer in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates both exactly or precisely the stated numerical value, and also, that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology relates to electrochemical cells including electrode assemblies having alloyed interfaces binding current collectors and electroactive material layers by the formation of chemical bonds. Such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples detail below include a single positive electrode cathode and a single anode, the skilled artisan will recognize that the present teachings also extend to various other configurations, including those having one or more cathodes and one or more anodes, as well as various current collectors with electroactive layers disposed on or adjacent to one or more surfaces thereof.

An exemplary and schematic illustration of an electrochemical cell (also referred to as a battery) 20 is shown in FIG. 1. The battery 20 includes a negative electrode 22 (e.g., anode), a positive electrode 24 (e.g., cathode), and a separator 26 disposed between the two electrodes 22, 24. The separator 26 provides electrical separation-prevents physical contact-between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24. In certain variations, the separator 26 may be formed by a solid-state electrolyte or a semi-solid-state electrolyte (e.g., gel electrolyte). For example, the separator 26 may be defined by a plurality of solid-state electrolyte particles (not shown). In the instance of solid-state batteries and/or semi-solid-state batteries, the positive electrode 24 and/or the negative electrode 22 may include a plurality of solid-state electrolyte particles (not shown). The plurality of solid-state electrolyte particles included in, or defining, the separator 26 may be the same as or different from the plurality of solid-state electrolyte particles included in the positive electrode 24 and/or the negative electrode 22.

A first current collector 32 (e.g., a negative current collector) may be positioned at or near the negative electrode (which can also be referred to as a negative electroactive material layer) 22. Although not illustrated, the skilled artisan will appreciate that, in certain variations, one or more negative electroactive material layers 22 may be disposed on one or more parallel sides of the first current collector 32. Similarly, the skilled artisan will appreciate that, in other variations, one or more negative electroactive material layers 22 may be disposed on a first side of the first current collector 32, and one or more positive electroactive material layer 24 may be disposed on a second side of the first current collector 32. In each instance, as further detailed below, the negative electroactive material layers 22 may be chemically bonded to the negative electrode current collector 32. The negative electrode current collector 32 together with the one or more negative electroactive material layers 22 may be referred to as a first (or negative) electrode assembly. The first current collector 32 may be a metal foil, metal grid or screen, metal foams, expanded metal, or perforated metal foils comprising copper including, for example, pure copper, as well as copper alloys, such as copper-zinc (brass) alloys, copper-tin (bronze) alloys, copper-lead alloys, copper-gold alloys, copper-indium alloys, copper-nickel alloys, and/or copper-silicon alloys. In certain variations, copper-containing current collectors may be coated, for example, by carbon coatings and/or lithiophilic, conductive coatings. In other variations, the first current collector 32 may be a metal foil, metal grid or screen, metal foams, expanded metal, or perforated metal foils comprising stainless steel.

A second current collector 34 (e.g., a positive current collector) may be positioned at or near the positive electrode (which can also be referred to as positive electroactive material layer) 24. Although not illustrated, the skilled artisan will appreciate that, in certain variations, one or more positive electroactive material layers 24 may be disposed on one or more parallel sides of the second current collector 34. Similarly, the skilled artisan will appreciate that, in other variations, one or more positive electroactive material layers 24 may be disposed on a first side of the second current collector 34, and one or more negative electroactive material layers 22 may be disposed on a second side of the second current collector 34. In each instance, the positive electrode current collector 34 together with the one or more positive electroactive material layers 24 may be referred to as a second (or positive) electrode assembly. The second electrode current collector 34 may be a metal foil, metal grid or screen, expanded metal, or perforated metal foils comprising aluminum or any other appropriate electrically conductive material known to those of skill in the art.

The first current collector 32 and the second current collector 34 may respectively collect and move free electrons to and from an external circuit 40. For example, an interruptible external circuit 40 and a load device 42 may connect the negative electrode 22 (through the first current collector 32) and the positive electrode 24 (through the second current collector 34). The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The electrochemical potential difference between the positive electrode 24 and the negative electrode 22 drives electrons produced by a reaction, for example, the oxidation of intercalated lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, the electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium-ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the first current collector 32, negative electrode 22, separator 26, positive electrode 24, and second current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, the present technology also applies to solid-state batteries and/or semi-solid state batteries that include solid-state electrolytes and/or solid-state electrolyte particles and/or semi-solid electrolytes and/or solid-state electroactive particles that may have different designs as known to those of skill in the art.

The size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. For example, in certain aspects, the electrolyte 30 may be a non-aqueous liquid electrolyte solution (e.g., >1 M) that includes a lithium salt dissolved in an organic solvent or a mixture of organic solvents. Numerous conventional non-aqueous liquid electrolyte 30 solutions may be employed in the battery 20.

A non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof. These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC), vinylene carbonate (VC), and the like), linear carbonates (e.g., dimethyl carbonate (DMC), diethyl carbonate (DEC), ethylmethylcarbonate (EMC), and the like), aliphatic carboxylic esters (e.g., methyl formate, methyl acetate, methyl propionate, and the like), γ-lactones (e.g., γ-butyrolactone, γ-valerolactone, and the like), chain structure ethers (e.g., 1,2-dimethoxyethane, 1-2-diethoxyethane, ethoxymethoxyethane, and the like), cyclic ethers (e.g., tetrahydrofuran, 2-methyltetrahydrofuran, 1,3-dioxolane, and the like), sulfur compounds (e.g., sulfolane), and combinations thereof.

The separator 26 may be a porous separator. For example, in certain instances, the separator 26 may be a microporous polymeric separator including, for example, a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic material and a heat-resistant material. For example, the separator 26 may also be admixed with the ceramic material and/or the heat-resistant material, or one or more surfaces of the separator 26 may be coated with the ceramic material and/or the heat-resistant material. In certain variations, the ceramic material and/or the heat-resistant material may be disposed on one or more sides of the separator 26. The ceramic material may be selected from the group consisting of: alumina ($Al_2O_3$), silica ($SiO_2$), and combinations thereof. The heat-resistant material may be selected from the group consisting of: Nomex, Aramid, and combinations thereof.

Various conventionally available polymers and commercial products for forming the separator 26 are contemplated, as well as the many manufacturing methods that may be employed to produce such a microporous polymer separator 26. In each instance, the separator 26 may have an average thickness greater than or equal to about 1 micrometer (μm) to less than or equal to about 50 μm, and in certain instances, optionally greater than or equal to about 1 μm to less than or equal to about 20 μm.

In various aspects, the porous separator 26 and/or the electrolyte 30 disposed in the porous separator 26 as illustrated in FIG. 1 may be replaced with a solid-state electrolyte ("SSE") and/or semi-solid-state electrolyte (e.g., gel) that functions as both an electrolyte and a separator. For example, the solid-state electrolyte and/or semi-solid-state electrolyte may be disposed between the positive electrode 24 and negative electrode 22. The solid-state electrolyte and/or semi-solid-state electrolyte facilitates transfer of lithium ions, while mechanically separating and providing electrical insulation between the negative and positive electrodes 22, 24. By way of non-limiting example, the solid-state electrolyte and/or semi-solid-state electrolyte may include a plurality of fillers, such as $LiTi_2(PO_4)_3$, $LiGe_2(PO_4)_3$, $Li_7La_3Zr_2O_{12}$, $Li_3xLa_{2/3}$-$xTiO_3$, $Li_3PO_4$, $Li_3N$, $Li_4GeS_4$, $LiioGeP_2S_{12}$, $Li_2S—P_2S_5$, $Li_6PS_5Cl$, $Li_6PS_5Br$, $Li_6PS_5I$, $Li_3OCl$, $Li_{2.99}$ $Ba_{0.005}ClO$, or combinations thereof. The semi-solid-state electrolyte may include a polymer host and a liquid electrolyte. The polymer host may include, for example, polyvinylidene fluoride (PVDF), polyvinylidene fluoride-hexafluoropropylene (PVDF-HFP), polyethylene oxide (PEO), polypropylene oxide (PPO), polyacrylonitrile (PAN), polymethacrylonitrile (PMAN), polymethyl methacrylate (PMMA), carboxymethyl cellulose (CMC), poly(vinyl alcohol) (PVA), polyvinylpyrrolidone (PVP), and combinations thereof. In certain variations, the semi-solid or gel electrolyte may also be found in the positive electrode 24 and/or the negative electrodes 22.

The positive electrode (also referred to as the positive electroactive material layer) 24 is formed from a lithium-based active material that is capable of undergoing lithium intercalation and deintercalation, alloying and dealloying, or plating and stripping, while functioning as the positive terminal of a lithium-ion battery. The positive electrode 24 can be defined by a plurality of electroactive material particles. Such positive electroactive material particles may be disposed in one or more layers so as to define the three-dimensional structure of the positive electrode 24. The electrolyte 30 may be introduced, for example after cell assembly, and contained within pores of the positive electrode 24. In certain variations, the positive electrode 24 may include a plurality of solid-state electrolyte particles. In each instance, the positive electrode 24 may have an average thickness greater than or equal to about 1 μm to less than or equal to about 500 μm, and in certain aspects, optionally greater than or equal to about 10 μm to less than or equal to about 200 μm.

In various aspects, the positive electroactive material layer 24 includes a layered oxide represented by $LiMeO_2$, where Me is a transition metal, such as cobalt (Co), nickel (Ni), manganese (Mn), iron (Fe), aluminum (Al), vanadium (V), or combinations thereof. In other variations, the positive electroactive material layer 24 includes an olivine-type oxide represented by $LiMePO_4$, where Me is a transition metal, such as cobalt (Co), nickel (Ni), manganese (Mn), iron (Fe), aluminum (Al), vanadium (V), or combinations thereof. In still other variations, the positive electroactive material layer 24 includes a monoclinic-type oxide represented by $Li_3Me_2(PO_4)_3$, where Me is a transition metal, such as cobalt (Co), nickel (Ni), manganese (Mn), iron (Fe), aluminum (Al), vanadium (V), or combinations thereof. In still other variations, the positive electroactive material layer 24 includes a spinel-type oxide represented by $LiMe_2O_4$, where Me is a transition metal, such as cobalt (Co), nickel (Ni), manganese (Mn), iron (Fe), aluminum (Al), vanadium (V), or combinations thereof. In still other variations, the positive electroactive material layer 24 includes a tavorite represented by $LiMeSO_4F$ and/or $LiMePO_4F$, where Me is a transition metal, such as cobalt (Co), nickel (Ni), manganese (Mn), iron (Fe), aluminum (Al), vanadium (V), or combinations thereof.

In still further variations, the positive electrode 24 may be a composite electrode including a combination of positive electroactive materials. For example, the positive electrode 24 may include a first positive electroactive material and a second electroactive material. A ratio of the first positive electroactive material to the second positive electroactive material may be greater than or equal to about 5:95 to less than or equal to about 95:5. In certain variations, the first and second electroactive materials may be independently selected from one or more layered oxides, one or more olivine-type oxides, one or more monoclinic-type oxides, one or more spinel-type oxide, one or more tavorite, or combinations thereof.

In each variation, the positive electroactive material may be optionally intermingled with an electronically conductive material (i.e., conductive additive) that provide an electron conductive path and/or a polymeric binder material that improve the structural integrity of the positive electrode 24. For example, the positive electrode 24 may include greater than or equal to about 70 wt. % to less than or equal to about 98 wt. %, and in certain aspects, optionally greater than or equal to about 80 wt. % to less than or equal to about 97 wt. %, of the positive electroactive material; greater than or equal to 0 wt. % to less than or equal to about 30 wt. %, and in certain aspects, optionally greater than or equal to about 0.5 wt. % to less than or equal to about 10 wt. %, of the electrically conducting material; and greater than or equal to 0 wt. % to less than or equal to about 20 wt. %, and in certain aspects, optionally greater than or equal to about 0.5 wt. % to less than or equal to about 10 wt. %, of the polymeric binder.

Example polymeric binders include polyimide, polyamic acid, polyamide, polysulfone, polyvinylidene difluoride (PVdF), polytetrafluoroethylene (PTFE), polyacrylic acid (PAA), blends of polyvinylidene fluoride and polyhexafluoropropene, polychlorotrifluoroethylene, ethylene propylene diene monomer (EPDM) rubber, carboxymethyl cellulose (CMC), nitrile butadiene rubber (NBR), styrene-butadiene rubber (SBR), lithium polyacrylate (LiPAA), sodium polyacrylate (NaPAA), sodium alginate, and/or lithium alginate. Electronically conducting materials may include, for example, carbon-based materials, powdered nickel or other metal particles, or conductive polymers. Carbon-based materials may include, for example, particles of graphite, acetylene black (such as KETCHEN™ black or DENKA™ black), carbon nanofibers and nanotubes (e.g., single wall carbon nanotubes (SWCNT), multiwall carbon nanotubes (MWCNT)), graphene (e.g., graphene platelets (GNP), oxidized graphene platelets), conductive carbon blacks (such as, SuperP (SP)), and the like. Examples of a conductive polymer include polyaniline, polythiophene, polyacetylene, polypyrrole, and the like.

The negative electrode (also referred to as a negative electroactive material layer) 22 is formed from a lithium host material that is capable of functioning as a negative terminal of a lithium-ion battery. In various aspects, the negative electrode 22 may include a lithium alloy and/or a lithium metal and the negative electrode 22 (e.g., lithium-containing electroactive material layer) may be chemically bonded to the negative electrode current collector 32.

Figure 2:
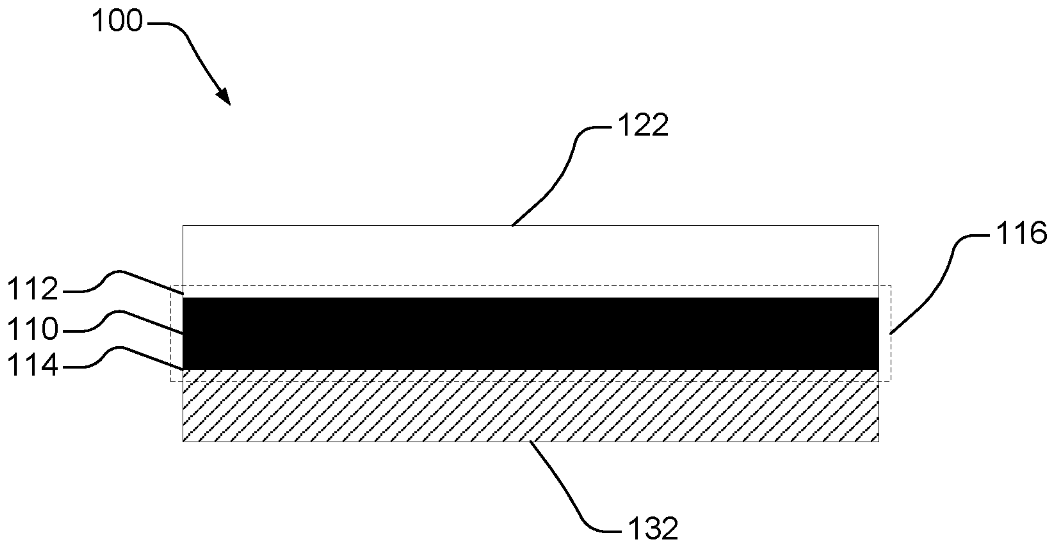
FIG. 2 is an illustration of an example electrode assembly having an alloyed interface binding a current collector and an electroactive material layer in accordance with various aspects of the present disclosure.
Figure 3:
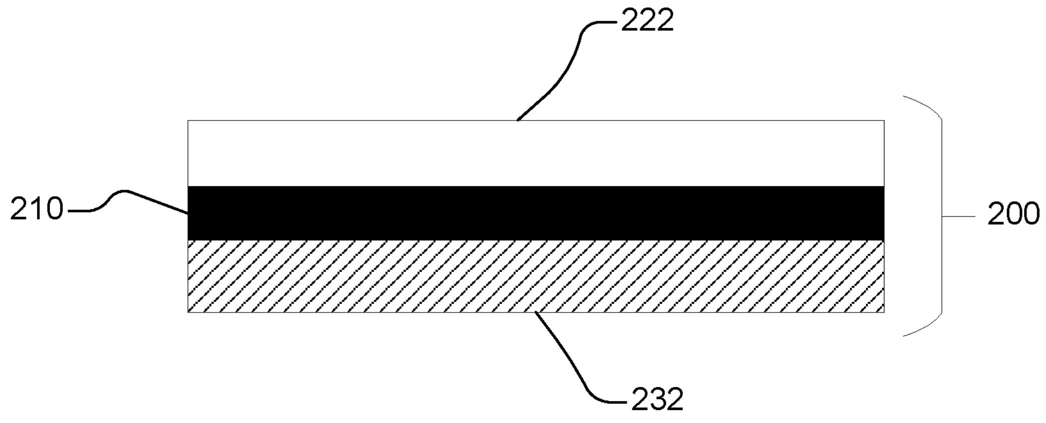
FIG. 3 is an illustration of another example electrode assembly having an alloyed interface binding a current collector and an electroactive material layer in accordance with various aspects of the present disclosure.

For example, in certain variations, as illustrated in FIG. 2, an electrode assembly 100 may include an intermediate layer 110 comprising indium and/or or gallium that forms alloys with a lithium-containing electroactive material layer 122 on a first side 112 and with a current collector 132 on a second side 114. The current collector 132 may include copper and/or stainless steel. An alloyed interface 116 includes the intermediate layer 110 and also respective portions of the current collector 132 and the lithium-containing electroactive material layer 122 that at least partially receives diffused indium and/or gallium (optionally in a concentration gradient) from the intermediate layer 110. In certain variations, the current collector 132 may have an average thickness greater than or equal to about 8 μm to less than or equal to about 60 μm, and in certain aspects, optionally greater than or equal to about 10 μm to less than or equal to about 50 μm; and the indium and/or or gallium diffuse into at least about 0.5%, and in certain aspects, optionally about 10%, of the total average thickness of the current collector 132. Similarly, the lithium-containing electroactive material layer 122 may have an average thickness greater than or equal to about 10 μm to less than or equal to about 100 μm and in certain aspects, optionally greater than or equal to about 20 μm to less than or equal to about 60 μm; and the indium and/or or gallium may diffuse into at least about 0.5%, and in certain aspects, optionally about 10%, of the total average thickness of the lithium-containing electroactive material layer 122. In certain variations, the alloyed interface 116 may have an average thickness greater than or equal to about 0.005 μm to less than or equal to about 5 μm, and in certain aspects, optionally greater than or equal to about 0.01 μm to less than or equal to about 2 μm; and the intermediate layer 110 may have an average thickness greater than or equal to about 0.001 μm to less than or equal to about 1 μm. The average thickness of the alloyed interface 116 will be larger than the average thickness of the intermediate layer 110. In each instance, the alloyed interface 116 can act as a lithiophilic interfacial layer that can reduce or eliminate dendrite formation In other variations, as illustrated in FIG. 3, an electrode assembly 200 may include an alloyed interlayer 210 that chemically bonds electroactive material layer 222 and a current collector 232 by the formation of metallurgical alloys. The alloyed interlayer 210 may a copper-lithium alloy or stainless steel-lithium alloy. In certain variations, the lithium-containing electroactive material layer 222 may have an average thickness greater than or equal to about 10 μm to less than or equal to about 100 μm, and in certain aspects, optionally greater than or equal to about 20 μm to less than or equal to about 60 μm; the current collector 232 may have an average greater than or equal to about 8 μm to less than or equal to about 60 μm, and in certain aspects, optionally greater than or equal to about 10 μm to less than or equal to about 50 μm; and the alloyed interlayer 210 may have an average greater than or equal to about 0.005 μm to less than or equal to about 5 μm, and in certain aspects, optionally greater than or equal to about 0.01 μm to less than or equal to about 2 μm.

In various aspects, the present disclosure provides methods for forming electrode assemblies including alloyed interlayers, like the electrode assembly 100 illustrated in FIG. 2 and/or the electrode assembly 200 illustrated in FIG. 3.

Figure 4:
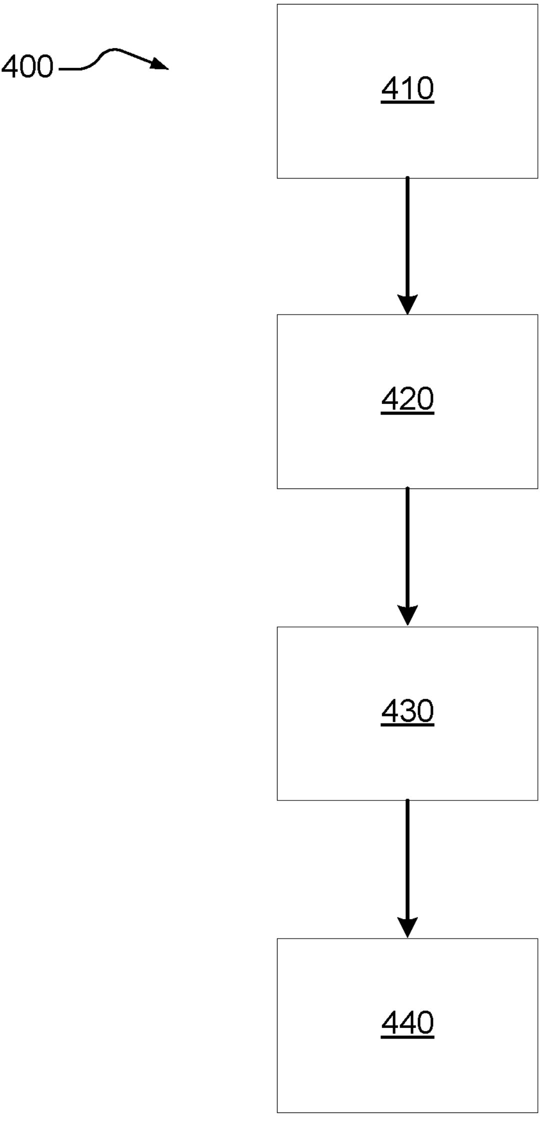
FIG. 4 is a flowchart illustrating an example method for forming an electrode assembly having an alloyed interface binding a current collector and an electroactive material layer, like the electrode assembly illustrated in FIG. 2, in accordance with various aspects of the present disclosure.

For example, in certain variations, as illustrated in FIG. 4, the present disclosure provides a method 400 for preparing an electrode assembly including an intermediate layer, like the electrode assembly 100 illustrated in FIG. 2. The method 400 may include obtaining 420 a precursor electrode assembly that includes an intermediate layer comprising indium and/or or gallium disposed between a lithium-containing electroactive material layer and a current collector. In certain variations, the method 400 may include preparing 410 the precursor electrode assembly. Preparing 410 the precursor electrode assembly may include, for example, coating one or more surfaces of the current collector with the indium and/or gallium and rolling the lithium-containing electroactive material layer onto an exposed surface of the indium and/or gallium.

In each variation, the method 400 includes heating 430 the intermediate layer to a temperature that is greater than the melting temperature of indium and/or or gallium but lower than the melting temperature of lithium to form the electrode assembly. Notably, the current collector has a melting temperature that is greater than the melting temperature of lithium. For example, in certain variations, such as when the intermediate layer includes indium, the intermediate layer may be heated to a temperature greater than or equal to about 155° C. to less than or equal to about 180° C., and in certain aspects, optionally about 165° C. In other variations, such as when the intermediate layer includes gallium, the intermediate layer may be heated to a temperature greater than or equal to about 29° C. to less than or equal to about 181° C., and in certain aspects, optionally about 100° C. In each instance, the intermediate layer may be heated using a one-sided or local heating method so as to avoid direct heating of the lithium-containing electroactive material layer, such as resistive heating using the current collector (e.g., pass current through the current collector); infrared heating using, for example, an infrared heating (e.g., electric, radiant gas, quartz, ceramic, or metal sheathed) that is able to emit infrared radiations that can heat the current collector without heating the air; and/or conduction/direct heating (e.g., hating pads, furnace heating, and the like) on the side of the current collector, and the molten indium and/or gallium can undergo a metallurgical alloying reaction on a first side with the lithium-containing electroactive material layer and on the second side with the current collector. In this manner, the indium and/or gallium defining the intermediate layer dissolves or diffuses into both lithium and copper and/or stainless steel so as to indirectly bind the lithium-containing electroactive material layer and the current collector without partially, or fully, melting the lithium or copper. As would be recognized, molten and resolidified lithium is likely to damage the intended structure. Also, liquid lithium is more reactive than solid lithium and more difficult to handle.

Figure 5A:
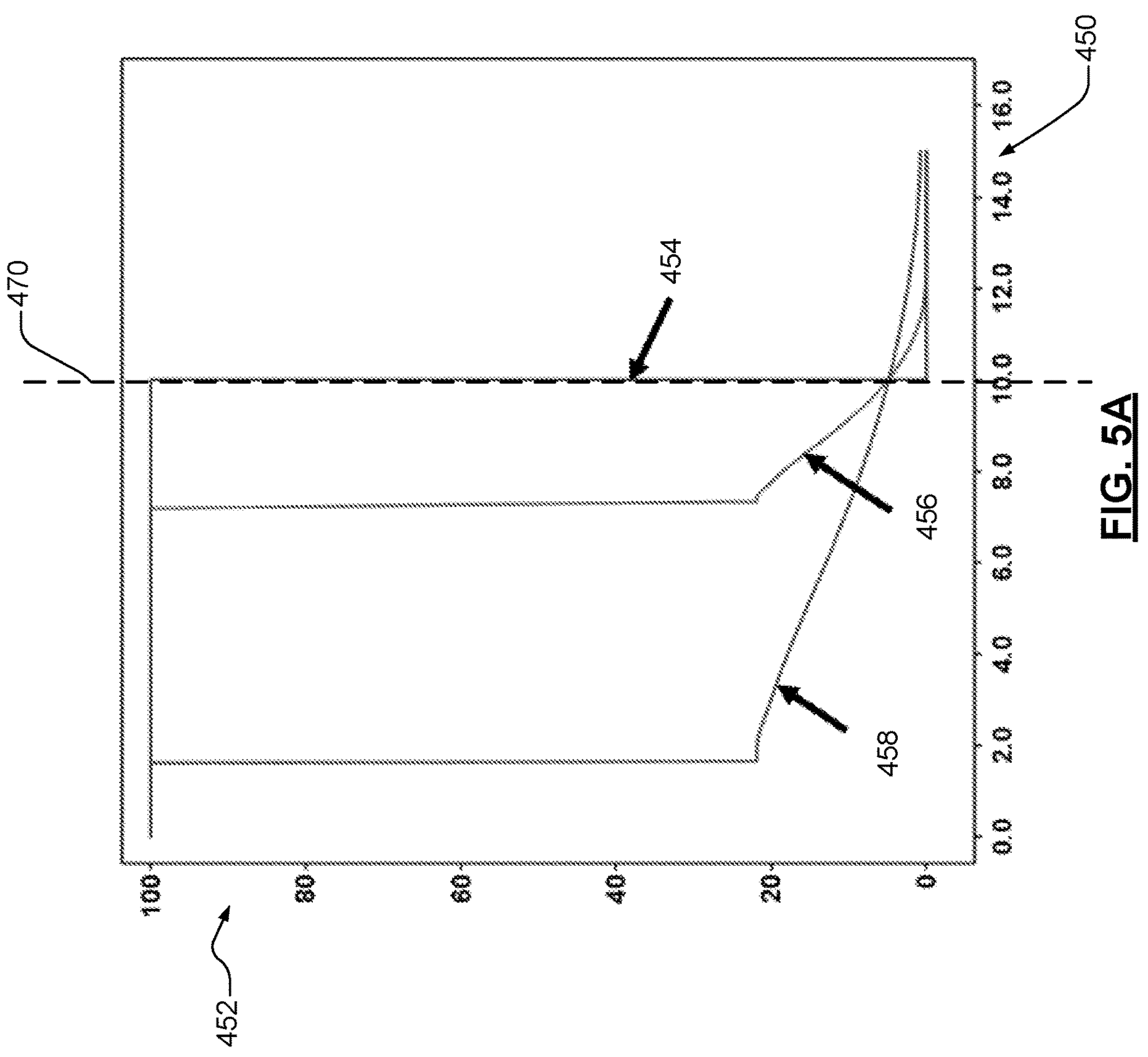
FIG. 5A is a graphical illustration demonstrating the diffusion of an intermediate into a lithium-containing electroactive material layer in accordance with the example method illustrated in FIG. 4.
Figure 5B:
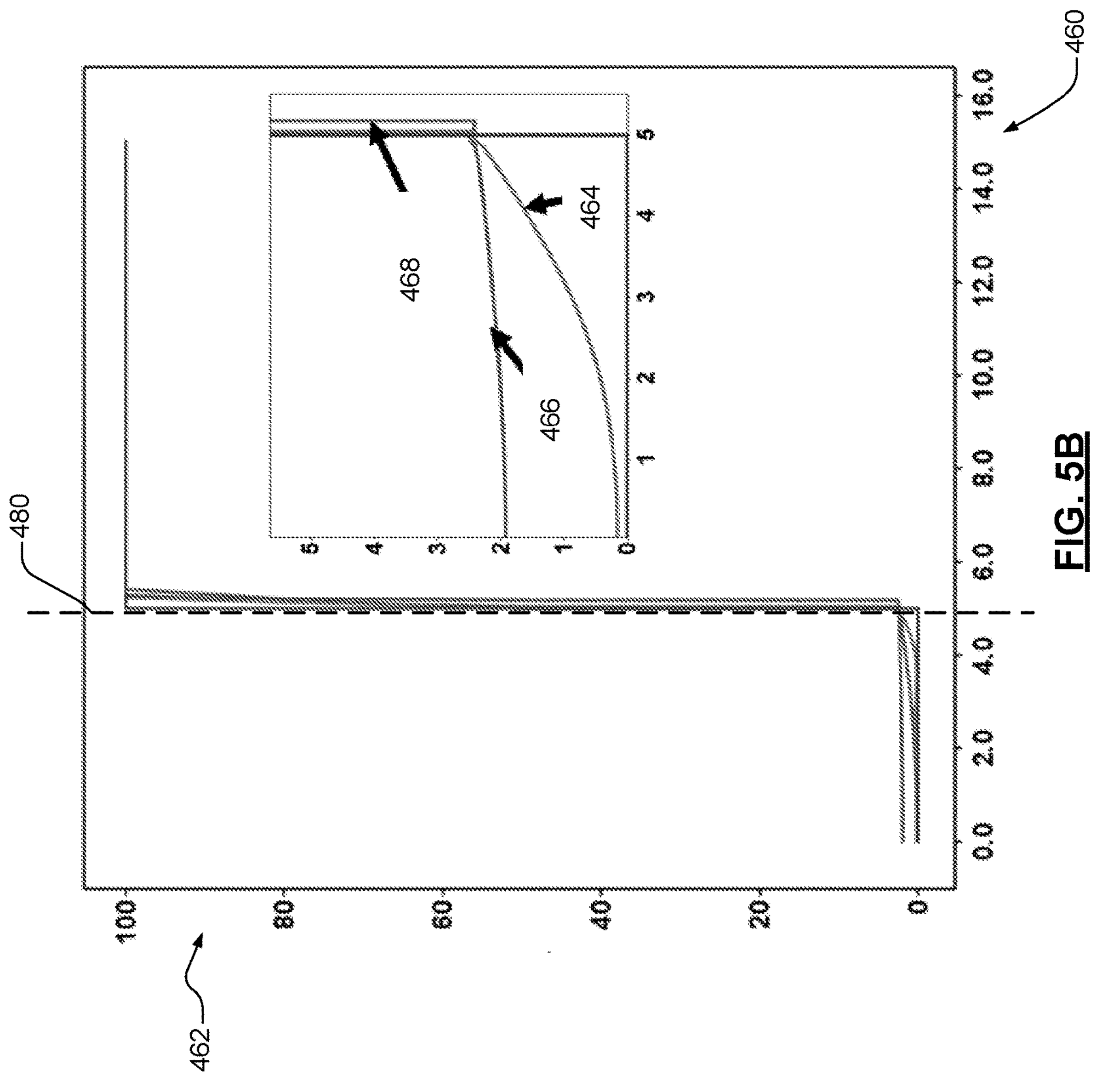
FIG. 5B is a graphical illustration demonstrating the diffusion of an intermediate into a copper-containing current collector in accordance with the example method illustrated in FIG. 4.

After at least partial diffusion of the indium and/or gallium (e.g., after a period greater than or equal to about 0.5 seconds to less than or equal to about 5 seconds), the method 400 may include cooling 440 the intermediate layer to room temperature (e.g., greater than or equal to about 20° C. to less than or equal to about 25° C.). For example, the diffusion of indium and/or gallium may be time dependent. As illustrated in FIG. 5A, where the x-axis 450 represents distance (μm), and the y-axis 452 represents mass percent, the longer the molten intermediate (i.e., indium and/or gallium) is maintained the further the indium and/or gallium travels through the thickness of the lithium-containing electroactive material. Line 470 represents the boundary between lithium (on the left from the viewer's perspective) and indium (on the right from the viewer's perspective). Line 454 is a baseline (t=0 seconds), while line 456 represents the electrode assembly about 0.01 seconds after the intermediate layer reaches the selected temperature, and line 458 represents the electrode assembly about 0.1 seconds after the intermediate layer reaches the selected temperature. Similarly, as illustrated in FIG. 5B, where the x-axis 460 represents distance (μm), and the y-axis 452 represents mass percent, the longer the molten intermediate (i.e., indium and/or gallium) is maintained the further the indium and/or gallium travels through the thickness of the current collector. Line 480 represents the boundary between indium (on the left from the viewer's perspective) and copper (on the right from the viewer's perspective). Line 464 is a baseline (t=0 seconds), while line 466 represents the electrode assembly about 0.01 seconds after the intermediate layer reaches the selected temperature, and line 468 represents the electrode assembly about 0.1 seconds after the intermediate layer reaches the selected temperature. In certain variations, the intermediate layer may be cooled using force cooling processes (e.g., quenching with dry air or inert gases like helium and/or argon with a cooling rate greater than or equal to about 100° C./s to less than or equal to about 500° C./s) or passive cooling processes.

Figure 6:
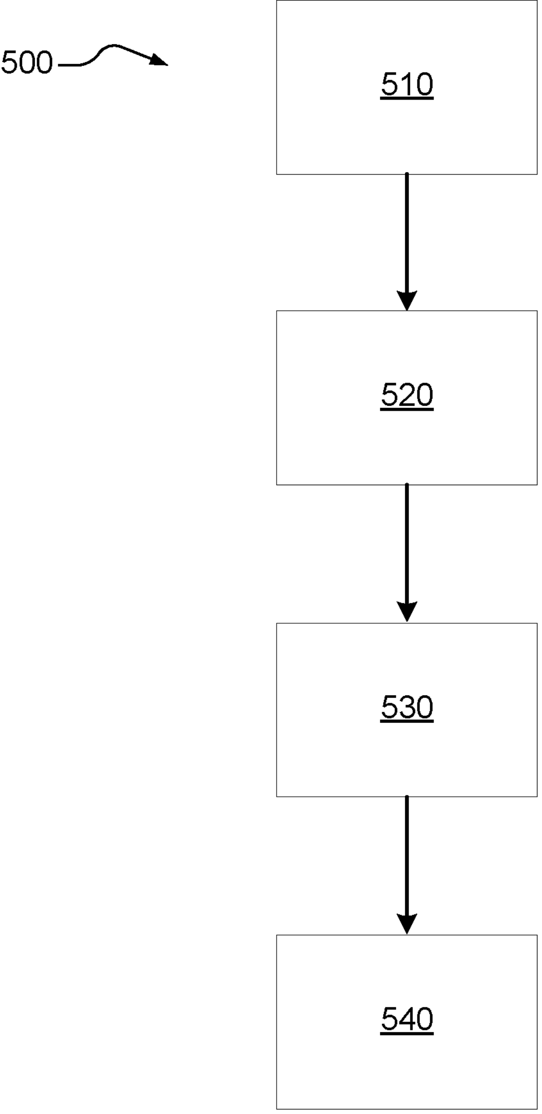
FIG. 6 is a flowchart illustrating an example method for forming an electrode assembly having an alloyed interface binding a current collector and an electroactive material layer, like the electrode assembly illustrated in FIG. 3, in accordance with various aspects of the present disclosure.

The present disclosure also provides a method 500 for preparing an electrode assembly including a lithium-copper alloy, like the electrode assembly 300 illustrated in FIG. 3. As illustrated, in FIG. 6, the method 500 includes obtaining 520 a precursor electrode assembly that includes a lithium-containing electroactive material layer disposed on or near one or more surfaces of a current collector. In certain variations, the method 50 may include preparing 510 the precursor electrode assembly. Preparing 510 the precursor electrode assembly may include, for example, rolling the lithium-containing electroactive material layer onto an the one or more surface of the current collector. In each variation, the method 500 includes heating 530 the current collector to a temperature to cause lithium near, or in contact with, the current collector to melt such that the localized molten lithium dissolves copper from the current collector to form the electrode assembly. The current collector may be heated to a temperature greater than the melting temperature of the lithium-containing electroactive material. For example, the current collector may be heated to a temperature greater than or equal to about 181° C. to less than or equal to about 300° C., and in certain aspects, optionally about 250° C. In certain variations, the current collector may be heated in a closed environment or system using a one-sided or local heating method so as to avoid direct heating of the lithium-containing electroactive material layer, such as resistive heating using the current collector (e.g., pass current through the current collector); infrared heating using, for example, an infrared heating (e.g., electric, radiant gas, quartz, ceramic, or metal sheathed) that is able to emit infrared radiations that can heat the current collector without heating the air; and/or conduction/direct heating (e.g., hating pads, furnace heating, and the like) on the side of the current collector In the instance of resistive heating, the applied voltage may be selected in response to the thickness of the current collector and/or diameter of a copper wires in a woven mesh defining the current collector. In this manner, the electrode assembly can be formed without the need to melt the lithium-containing electroactive material in its entirety and/or without exposing molten lithium to the external environment and also addresses solubility issues of copper in solid-state lithium.

Figure 7:
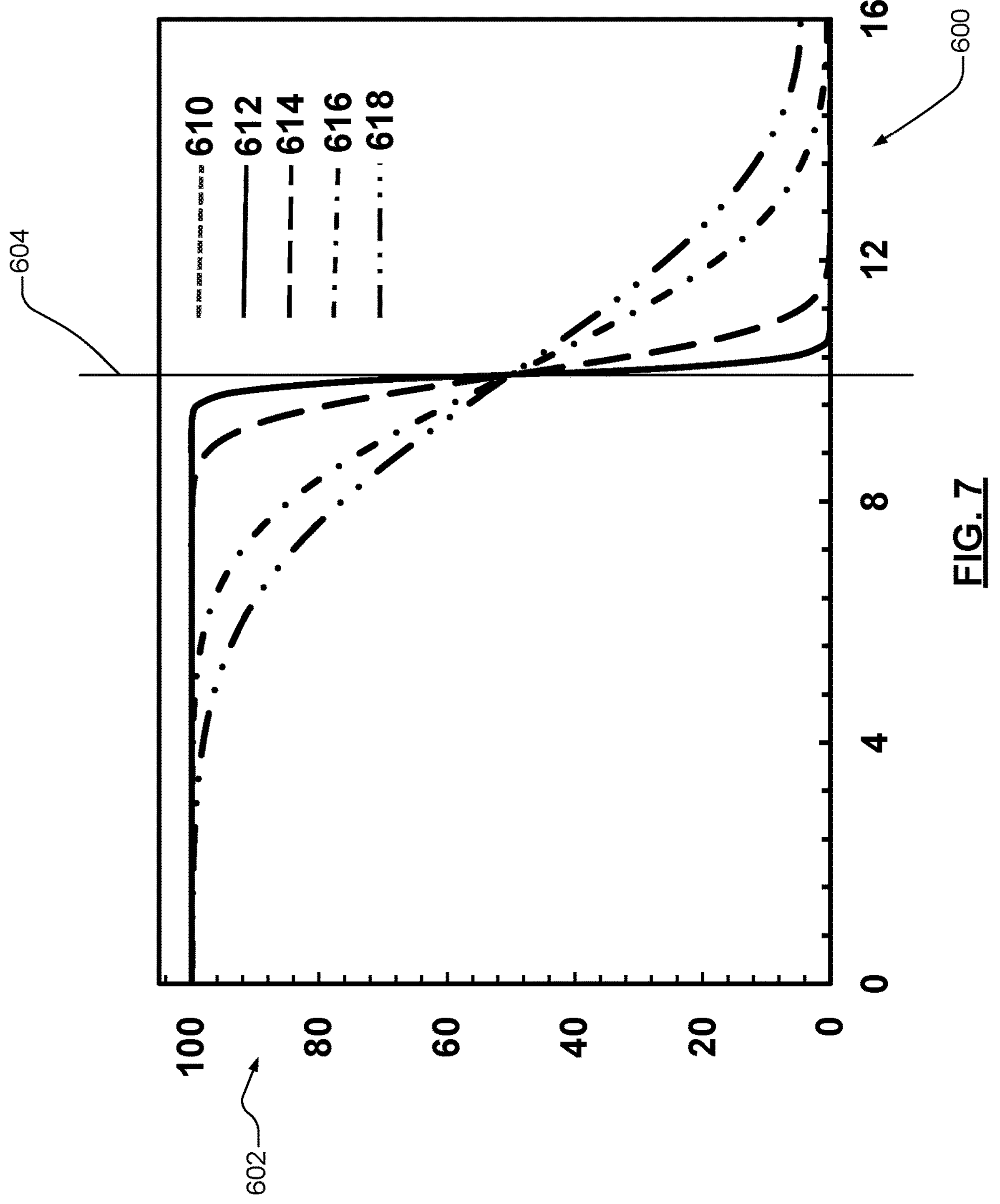
FIG. 7 is a graphical illustration demonstrating the diffusion of copper into a lithium-containing electroactive material layer in accordance with the example method illustrated in FIG. 6.

After at least partial diffusion of copper and/or stainless steel from the current collector (e.g., after a period greater than or equal to about 0.5 seconds to less than or equal to about 5 seconds), the method 500 may include cooling 540 the electrode assembly to room temperature. For example, the diffusion of the copper into the molten lithium may be time dependent. As illustrated in FIG. 7, where the x-axis 600 represents distance (μm), and the y-axis 602 represents concentration (wt. %), the longer the molten lithium is maintained the further the coppers travels through the thickness of the lithium-containing electroactive material. Line 604 represents the boundary between copper (on the left from the viewer's perspective) and lithium (on the right from the viewer's perspective). Line 610 is a baseline where no melting occurs, while line 612 represents the electrode assembly 0.005 seconds after the current collector reaches the temperature, line 614 represents 0.05 seconds after the current collector reaches the temperature, line 616 represents 0.5 seconds after current collector reaches the temperature, and line 618 represents 1 second after the current collector reaches the temperature. In certain variations, the cooling 540 may include a quenching process having, for example, a cooling rate greater than or equal to about 100° C./s to less than or equal to about 500° C./s, so as to maintain the interfacial layer following the cooling process. In certain variations, the cooling 540 may occur via radiative cooling, for example, by passing through a cold chamber, or conductive cooling, for example, by blowing dry air onto the current collector and/or making contact with the current collector.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrode assembly of an electrochemical cell that cycles lithium ions, the electrode assembly comprising:

a current collector;

a lithium metal foil; and an alloyed interface chemically binding the current collector and the lithium metal foil, the alloyed interface comprising indium, gallium, or an alloy of indium and gallium and defined by an intermediate layer disposed between the current collector and the lithium metal foil, a portion of the current collector adjacent to the intermediate layer and alloyed with the indium, gallium, or alloy of indium and gallium and that is at least 0.5% of an average thickness of the current collector, and a portion of the lithium metal foil adjacent to the intermediate layer and alloyed with the indium, gallium, or alloy of indium and gallium and that is at least 0.5% of an average thickness of the lithium metal foil.

2. The electrode assembly of claim 1, wherein the current collector comprises copper, stainless steel, or a combination thereof.

3. The electrode assembly of claim 1, wherein the intermediate layer has an average thickness greater than or equal to about 0.001 micrometers to less than or equal to about 1 micrometer; and the alloyed interface has an average thickness greater than or equal to about 0.005 micrometers to less than or equal to about 5 micrometers.

4. The electrode assembly of claim 3, wherein the current collector has an average thickness greater than or equal to about 8 micrometers to less than or equal to about 60 micrometers; and the lithium metal foil has an average thickness greater than or equal to about 10 micrometers to less than or equal to about 100 micrometers.

5. A method of preparing an electrode assembly for an electrochemical cell that cycles lithium ions, the method comprising:

heating a precursor electrode assembly using a one-sided heating method, the precursor electrode comprising a current collector, a lithium metal foil, and an intermediate layer disposed between the current collector and the lithium metal foil, the intermediate layer comprising indium, gallium, or an alloy of indium and gallium, the heating comprising raising a temperature of the current collector to a temperature above a melting temperature of the intermediate layer such that a first surface of the intermediate layer adjacent to the current collector forms an alloy with a portion of the current collector opposing the intermediate layer and a second surface of the intermediate layer adjacent to the lithium metal foil forms an alloy with a portion of the lithium metal foil opposing the intermediate layer to form the electrode assembly, the portion of the current collector being at least 0.5% of an average thickness of the current collector, the portion of the lithium metal foil being at least 0.5% of an average thickness of the lithium metal foil, the intermediate layer together with the portion of the current collector and the portion of the lithium metal foil defining an alloyed interface that chemically binds the current collector and the lithium metal foil, the alloyed interface together with the current collector and the lithium metal foil defining the electrode assembly.

6. The method of claim 5, wherein the current collector comprises copper, stainless steel, or a combination thereof.

7. The method of claim 5, wherein the temperature is greater than or equal to about 29° C. to less than or equal to about 181° C.

8. The method of claim 5, wherein the temperature is a first temperature, and the method further comprises cooling the electrode assembly to a second temperature that is greater than or equal to about 20° C. to less than or equal to about 25° C.

9. The method of claim 8, wherein the current collector is held at the first temperature for a period greater than or equal to about 0.5 second to less than or equal to about 5 seconds.

* * * * *